United States Patent [19]

Leinwander et al.

[11] Patent Number: 5,867,721
[45] Date of Patent: Feb. 2, 1999

[54] SELECTING AN INTEGRATED CIRCUIT FROM DIFFERENT INTEGRATED CIRCUIT ARRAY CONFIGURATIONS

[75] Inventors: Mark P. Leinwander, Folsom; Steven E. Wells, Citrus Heights; Robert N. Hasbun, Shingle Springs, all of Calif.

[73] Assignee: Intel Corporation, Santa Clara, Calif.

[21] Appl. No.: 978,998

[22] Filed: Nov. 28, 1997

Related U.S. Application Data

[63] Continuation of Ser. No. 384,862, Feb. 7, 1995, abandoned.

[51] Int. Cl.$^6$ .................................................. G06F 12/08
[52] U.S. Cl. .............................. 395/800.01; 395/800.14; 395/800.17; 395/479.1
[58] Field of Search ................... 395/800.39, 800.01, 395/800.17, 800.14, 479.1; 365/189, 52, 63

[56] References Cited

U.S. PATENT DOCUMENTS

| | | | |
|---|---|---|---|
| 4,432,067 | 2/1984 | Nielsen | 364/900 |
| 4,757,477 | 7/1988 | Nagayama et al. | 365/230 |
| 4,860,255 | 8/1989 | Shimohigashi et al. | 365/189 |
| 5,040,150 | 8/1991 | Naitoh et al. | 365/201 |
| 5,065,368 | 11/1991 | Gupta | 365/230.05 |
| 5,179,687 | 1/1993 | Hidaka et al. | 395/425 |
| 5,257,237 | 10/1993 | Aranda et al. | 365/230.05 |
| 5,302,104 | 4/1994 | Yalamanchili | 395/800 |
| 5,353,427 | 10/1994 | Fujishima et al. | 395/425 |
| 5,416,748 | 5/1995 | Fujita | 365/230.06 |
| 5,467,317 | 11/1995 | Kameda et al. | 365/230.06 |
| 5,509,132 | 4/1996 | Matsuda et al. | 395/403 |
| 5,513,135 | 4/1996 | Dell et al. | 365/52 |
| 5,527,740 | 6/1996 | Golwalkar et al. | 437/206 |
| 5,581,498 | 12/1996 | Ludwig et al. | 365/63 |

OTHER PUBLICATIONS

—"DD28F032SA 32–MBit (2Mbit x 16, 4 MBit x 8) Flashfile™Memory," *Flash Memory*, Vol. I, 1994, Intel Corporation, pp. 3–1 through 3–5 (Oct. 1993).
—"28F016SA 16 MBit (1 MBit x 16, 2 MBit x 8) Flashfile™Memory," *Flash Memory*, Vol. I, 1994, Intel Corporation, pp. 3–6 through 3–48 (Oct. 1993).

*Primary Examiner*—Alyssa H. Bowler
*Assistant Examiner*—Dzung C. Nguyen
*Attorney, Agent, or Firm*—Blakely, Sokoloff, Taylor & Zafman LLP

[57] ABSTRACT

A circuit for selecting a select line from a plurality of first and second select lines is described. Each of an array of integrated circuit (IC) packages is coupled to (1) one of the first select lines and (2) at least one of the second select lines. The circuit includes a decoder for decoding a select data to select the select line, and circuitry for modifying the select data before the select data is applied to the decoder when each of the second select lines is not coupled to an IC device within each of the IC packages to ensure that the select line is not one of the second select lines. When each of the first and second select lines is coupled to an IC device within each of the IC packages, the circuitry for modifying does not modify the select data. A method for selecting a selected IC device within a selected IC package of an array of IC packages is also described.

18 Claims, 9 Drawing Sheets

| $\overline{CS_{Y_i}}$ | $\overline{CS_{X_i}}$ | $\overline{CS_{X_{i+1}}}$ | $\overline{CE_1}$ | $\overline{CE_2}$ | REMARKS |
|---|---|---|---|---|---|
| 1 | X | X | 1 | 1 | BOTH NOT SELECTED |
| 0 | 0 | 1 | 0 | 1 | CHIP1 SELECTED |
| 0 | 1 | 0 | 1 | 0 | CHIP2 SELECTED |
| 0 | 0 | 0 | - | - | NOT VALID |
| 0 | 1 | 1 | 1 | 1 | BOTH NOT SELECTED |

X = DO NOT CARE

*Fig. 6 (Prior Art)*

| REG | | | SELECT | | | X0 | X1 | X2 | X3 | X4 | X5 | X6 | X7 | REMARKS |
|---|---|---|---|---|---|---|---|---|---|---|---|---|---|---|
| BIT2 | BIT1 | BIT0 | SBIT2 | SBIT1 | SBIT0 | | | | | | | | | |
| 0 | 0 | 0 | 0 | 0 | 0 | 1 | 0 | 0 | 0 | 0 | 0 | 0 | 0 | FOR DUAL CHIP MEMORY PACKAGES |
| 0 | 0 | 1 | 0 | 0 | 1 | 0 | 1 | 0 | 0 | 0 | 0 | 0 | 0 | |
| 0 | 1 | 0 | 0 | 1 | 0 | 0 | 0 | 1 | 0 | 0 | 0 | 0 | 0 | |
| 0 | 1 | 1 | 0 | 1 | 1 | 0 | 0 | 0 | 1 | 0 | 0 | 0 | 0 | |
| 1 | 0 | 0 | 1 | 0 | 0 | 0 | 0 | 0 | 0 | 1 | 0 | 0 | 0 | |
| 1 | 0 | 1 | 1 | 0 | 1 | 0 | 0 | 0 | 0 | 0 | 1 | 0 | 0 | |
| 1 | 1 | 0 | 1 | 1 | 0 | 0 | 0 | 0 | 0 | 0 | 0 | 1 | 0 | |
| 1 | 1 | 1 | 1 | 1 | 1 | 0 | 0 | 0 | 0 | 0 | 0 | 0 | 1 | |
| 0 | 0 | 0 | 1 | 0 | 0 | 1 | 0 | 0 | 0 | 0 | 0 | 0 | 0 | FOR SINGLE CHIP MEMORY PACKAGES |
| 0 | 0 | 1 | 1 | 0 | 1 | 0 | 0 | 1 | 0 | 0 | 0 | 0 | 0 | |
| 0 | 1 | 0 | 1 | 1 | 0 | 0 | 0 | 0 | 0 | 1 | 0 | 0 | 0 | |
| 0 | 1 | 1 | 1 | 1 | 1 | 0 | 0 | 0 | 0 | 0 | 0 | 1 | 0 | |

Fig. 9

SELECTING AN INTEGRATED CIRCUIT FROM DIFFERENT INTEGRATED CIRCUIT ARRAY CONFIGURATIONS

This is a continuation of application Ser. No. 08/384,862, filed Feb. 7, 1995, now abandoned.

FIELD OF THE INVENTION

The present invention pertains to the field of integrated circuits. More particularly, this invention relates to circuitry and a method for selecting an integrated circuit from different integrated circuit array configurations.

BACKGROUND OF THE INVENTION

A prior art computer or data processing system typically includes a central processing unit ("CPU") that is coupled to a storage system. The CPU can be implemented by a microprocessor. The storage system typically includes a number of memory devices. Each of the memory devices can be accessed by the CPU.

In order to select a memory device from a number of memory devices for a memory operation, the CPU needs to generate a chip select signal to the selected memory device. The chip select signal then activates or enables the selected memory device to receive addresses and control information from the CPU for the desired read or write operation. Currently, there are a number of prior art schemes for selecting a memory device from a number of memory devices.

FIG. 1 shows one prior art scheme of selecting a memory device from a number of memory devices. As shown in FIG. 1, each of memory chips or devices 13a through 13f is connected to a CPU 11 via bus 12. In addition, each of memory devices 13a–13f includes a chip enable input $\overline{CE}$ that receives one of a number of chip select signals $\overline{CS0}$ through $\overline{CS5}$ from CPU 11 via one of a number of chip select lines 14a through 14f coupled between CPU 11 and memory devices 13a–13f. For example, memory device 14a receives the chip select signal $\overline{CS0}$ via line 14a and memory device 13d receives the chip select signal $\overline{CS3}$ via line 14d. When, for example, CPU 11 needs to access memory device 13b, CPU 11 asserts the $\overline{CS1}$ chip select signal via line 14b to memory device 13b. This causes memory device 13b to be enabled to receive address and other information from CPU 11 via bus 12 for the desired read or write operation.

Disadvantages are, however, associated with the above-described prior art scheme. One disadvantage is that CPU 11 needs to be individually connected to each of the chip select lines 14a–14f in order to individually asserts each of the chip select signals $\overline{CS0}$ through $\overline{CS5}$. This typically causes the CPU to have a relatively large number of chip select pins. When the number of memory devices increases, the number of CPU pins used to supply the chip select signals increases accordingly. As is known, a pin typically requires relatively large die area to construct. Therefore, a CPU with a large number of pins is typically large in size.

One prior art solution to this problem is shown in FIG. 2. As can be seen from FIG. 2, memory devices 23a through 23i are arranged in an array 23. In addition, a chip select signal decoder 22 is connected between CPU 21 and array 23. Decoder 22 decodes a chip select data from CPU 21 to assert one of the column select signals $\overline{CS_{Y0}}$ through $\overline{CS_{Y2}}$ and one of the row select signals $\overline{CS_{X0}}$ through $\overline{CS_{X2}}$. The memory device at the intersection of the asserted row and column select signals is the selected memory device. FIG. 3 shows in block diagram form the circuitry of each of memory devices 23a through 23i.

As can be seen from FIGS. 2 and 3, the number of memory devices 23a–23i is greater than the total number of the column and row chip select signals $\overline{CS_{Y0}}$–$\overline{CS_{Y2}}$ and $\overline{CS_{X0}}$–$\overline{CS_{X2}}$. In addition, the number of pins required for CPU 21 to supply the chip select data is also less than the total number of the column and row chip select signals $\overline{CS_{Y0}}$–$\overline{CS_{Y2}}$ and $\overline{CS_{X0}}$–$\overline{CS_{X2}}$ generated by decoder 22. This therefore allows CPU 21 and decoder 22 to have fewer pins for providing the chip select signals. As can be seen from FIG. 2, only six chip select signals (i.e., $\overline{CS_{Y0}}$–$\overline{CS_{Y2}}$ and $\overline{CS_{X0}}$–$\overline{CS_{X2}}$) are used to select nine memory devices 23a–23i. Also, CPU 21 only needs to supply a four-bit chip select data to generate these chip select signals.

As the integrated circuit fabrication and packaging technologies advance, a memory device package can contain more than one memory chip or device. FIGS. 4 through 6 illustrate one prior art scheme of selecting a memory device from an array of memory packages 33a through 33i, wherein each of memory packages 33a–33i includes two memory devices (shown in FIG. 5). As can be seen from FIG. 4, memory packages 33a–33i are still arranged in an array 33. Each of memory packages 33a–33i receives two of the row select signals $\overline{CS_{X0}}$ through $\overline{CS_{X5}}$. Again, as can be seen from FIGS. 4–6, decoder 32 uses fewer select signals to select among a relatively large number of memory chips arranged in an array.

The above-described prior art scheme still bears disadvantages. One disadvantage is that if each of memory packages 33a–33i includes only one memory device, the array configuration shown in FIG. 4 is no longer suitable and therefore needs to be changed. However, it is typically difficult to change the array configuration because, as is known, the array configuration is typically part of a printed circuit board ("PCB") layout. To change the array configuration simply means using a separate printed circuit board.

SUMMARY AND OBJECTS OF THE INVENTION

One of the objects of the present invention is to select an integrated circuit from different integrated circuit array configurations.

Another object of the present invention is to provide circuitry for selecting an integrated circuit from different array configurations without changing the configuration of the array.

A further object of the present invention is to select an integrated circuit from an array of integrated circuit packages without changing the array configuration, wherein each of the integrated circuit packages in the array may contain one integrated circuit device or more than one integrated circuit device.

A circuit for selecting a select line from a plurality of first and second select lines is described. Each of an array of integrated circuit (IC) packages is coupled to (1) one of the first select lines and (2) at least one of the second select lines. The circuit includes a decoder for decoding a select data to select the select line, and circuitry for modifying the select data before the select data is applied to the decoder when each of the second select lines is not coupled to an IC device within each of the IC packages in order to ensure that the select line is not one of the second select lines. When each of the first and second select lines is coupled to an IC device within each of the IC packages, the circuitry for modifying does not modify the select data.

An IC array includes a plurality of IC packages, a plurality of column select lines, and a plurality of first and second row select lines. Each of the IC packages contains at least one IC device and is coupled to one of the column select lines, one of the first row select lines, and at least one of the second row select lines. A method for selecting a selected IC device within a selected IC package of the array includes the step of decoding a column select data to select a selected column select line from the column select lines. A row select data is also decoded to select a selected row select line from the first and second row select lines. The selected column and row select lines select the selected IC device within the selected IC package. The row select data is modified before the row select data is decoded if each of the second row select lines is not coupled to any IC device within each of the IC packages in order to ensure that the selected row select line is not one of the second row select lines.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 6 is a truth table illustrating the relationship of the signals shown in FIG. 5;

FIG. 9 is a truth table illustrating the relationship of the row select signals and the row select data shown in FIGS. 7 and 8.

DETAILED DESCRIPTION

Figure 7:
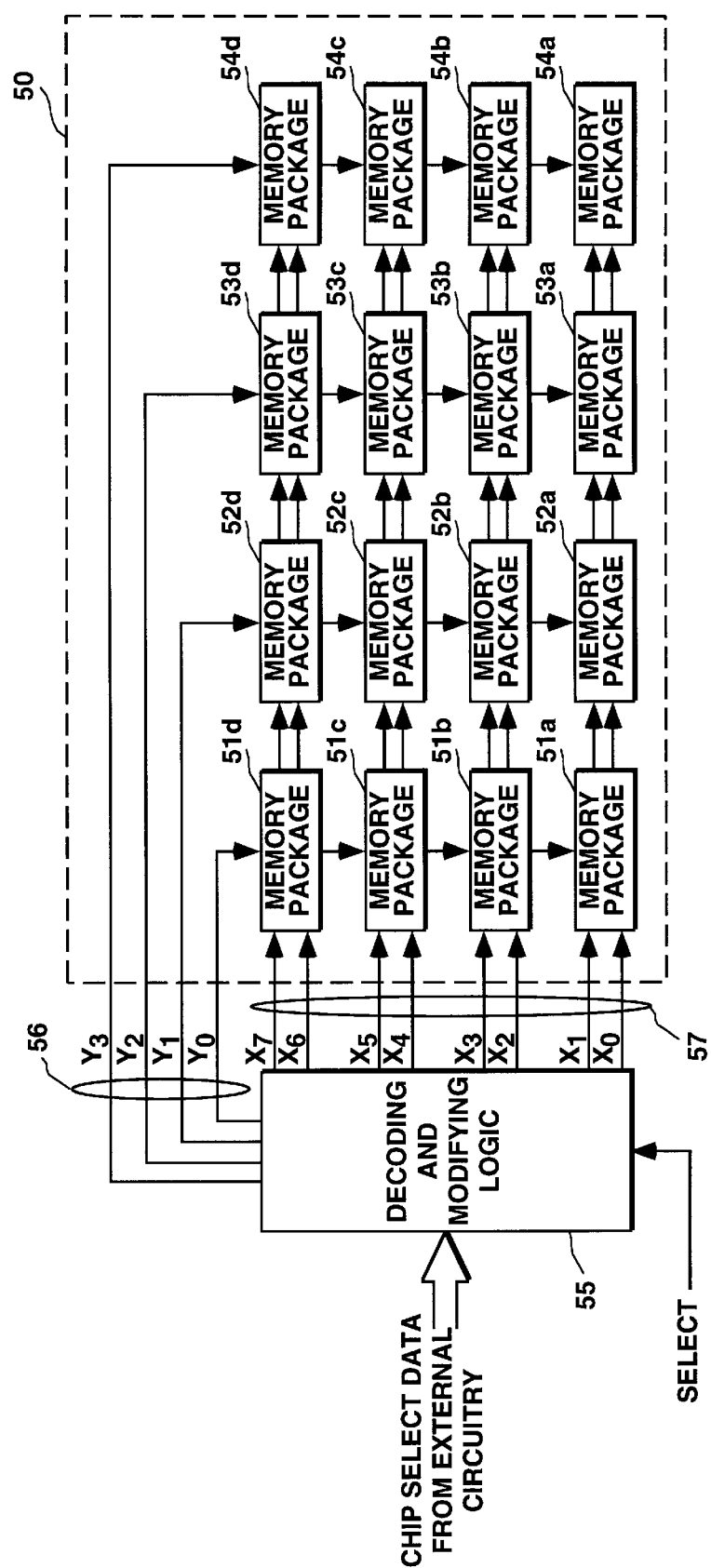
FIG. 7 shows a scheme of selecting an integrated circuit device from an array of integrated circuit packages in accordance with one embodiment of the present invention, wherein each of the integrated circuit packages can contain one or two integrated circuit devices.

FIG. 7 shows in block diagram form a number of memory packages 51a through 54d arranged in an array 50. FIG. 7 also shows a decoding and modifying logic 55 that implements one embodiment of the present invention. Logic 55 is used to decode a chip select data to select one of memory packages 51a through 54d. Logic 55, when enabled, also modifies the chip select data before decoding the data.

Array 50 shown in FIG. 7 can be part of a memory system for any computer or data processing system. Each of memory packages 51a–54d shown in FIG. 7 may contain one memory device or two memory devices.

Alternatively, array 50 can be constructed such that each of memory packages 51a–54d can contain more than two memory devices. This will be described in more detail below. Moreover, each of memory packages 51a–54d can simply be an IC package that contains one or more IC device.

Each of memory packages 51a–54d can be a plastic package or a ceramic package. In one embodiment, each of memory packages 51a–54d is a thin small outline package ("TSOP"). Alternatively, each of memory packages 51a–54d can be other type of package. For example, a ceramic pin grid array package, a plastic leaded chip carrier ("PLCC") package, or plastic dual in-line package ("PDIP") can be used for each of memory packages 51a–54d.

When each of memory packages 51a–54d contains one memory device or chip, each of memory packages 51a–54d is a single die memory package. When each of memory packages 51a–54d contains two memory chips or devices, each of memory packages is a dual die memory package.

As shown in FIG. 7, array 50 also includes a number of column select lines 56 and row select lines 57. Each of column select lines 56 provides one of column select signals Y0 through Y3 to array 50 and each of row select lines 57 provides one of row select signals X0 through X7 to array 50. FIG. 7 only shows four column select lines and eight row select lines. In practice, more column and row select lines may be included in array 50. In fact, the number of column and row select lines of array 50 depend on the number of memory packages in array 50.

As shown in FIG. 7, each of memory packages 51a–54d is connected to two of row select lines 57. This allows each of memory packages 51a–54d to contain two memory chips or other IC chips. Alternatively, each of memory packages 51a–54d is connected to three or more of row select lines 57. This allows each of memory packages 51a–54d to contain three or more memory or IC chips. When each of memory packages 51a–54d is connected to four of row select lines 57, each of memory packages 51a–54d can contain four memory or other IC chips. The maximum number of the chips allowed within each of memory packages 51a–54d corresponds to the number of row select lines connected to each of memory packages 51a–54d. In addition, column select lines 56 may be swapped with row select lines 57.

Figure 1:
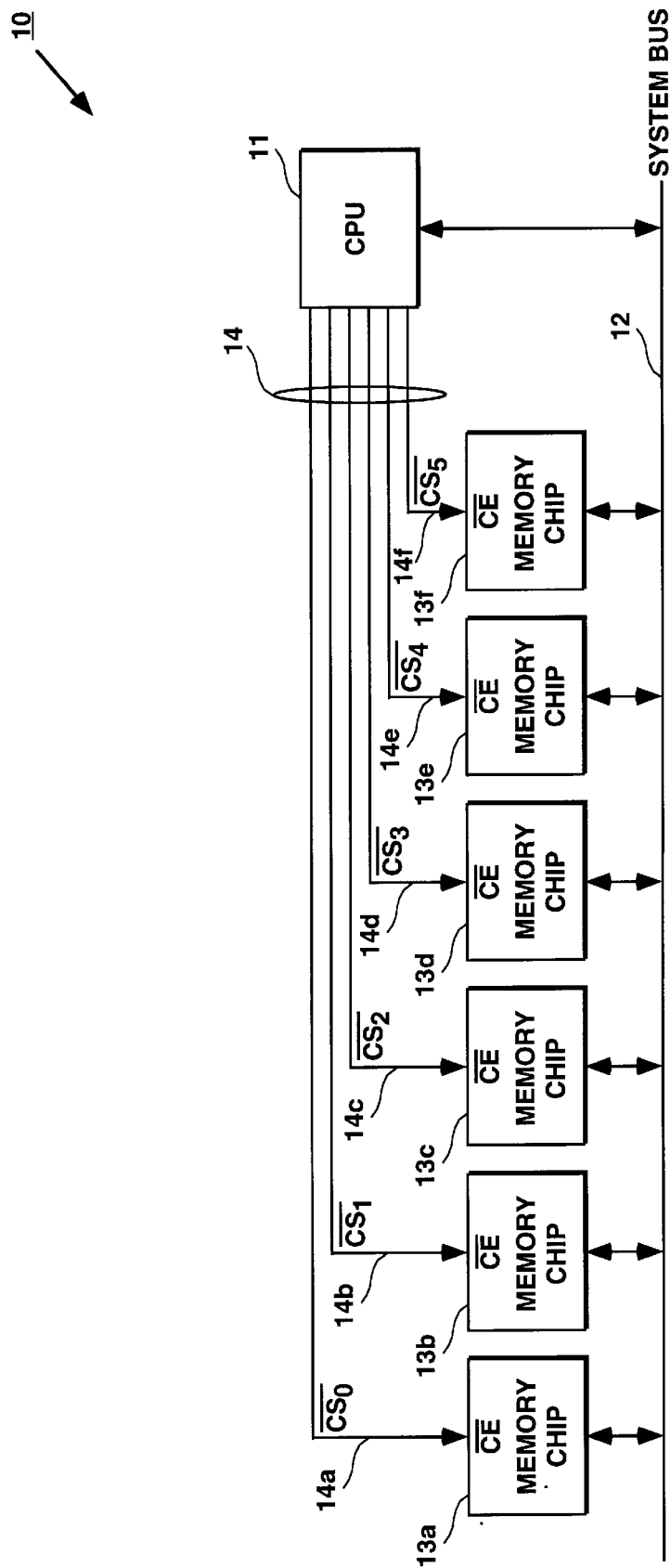
FIG. 1 is a block diagram of a prior art scheme of selecting a memory device from a number of memory devices in a computer system.
Figure 2:
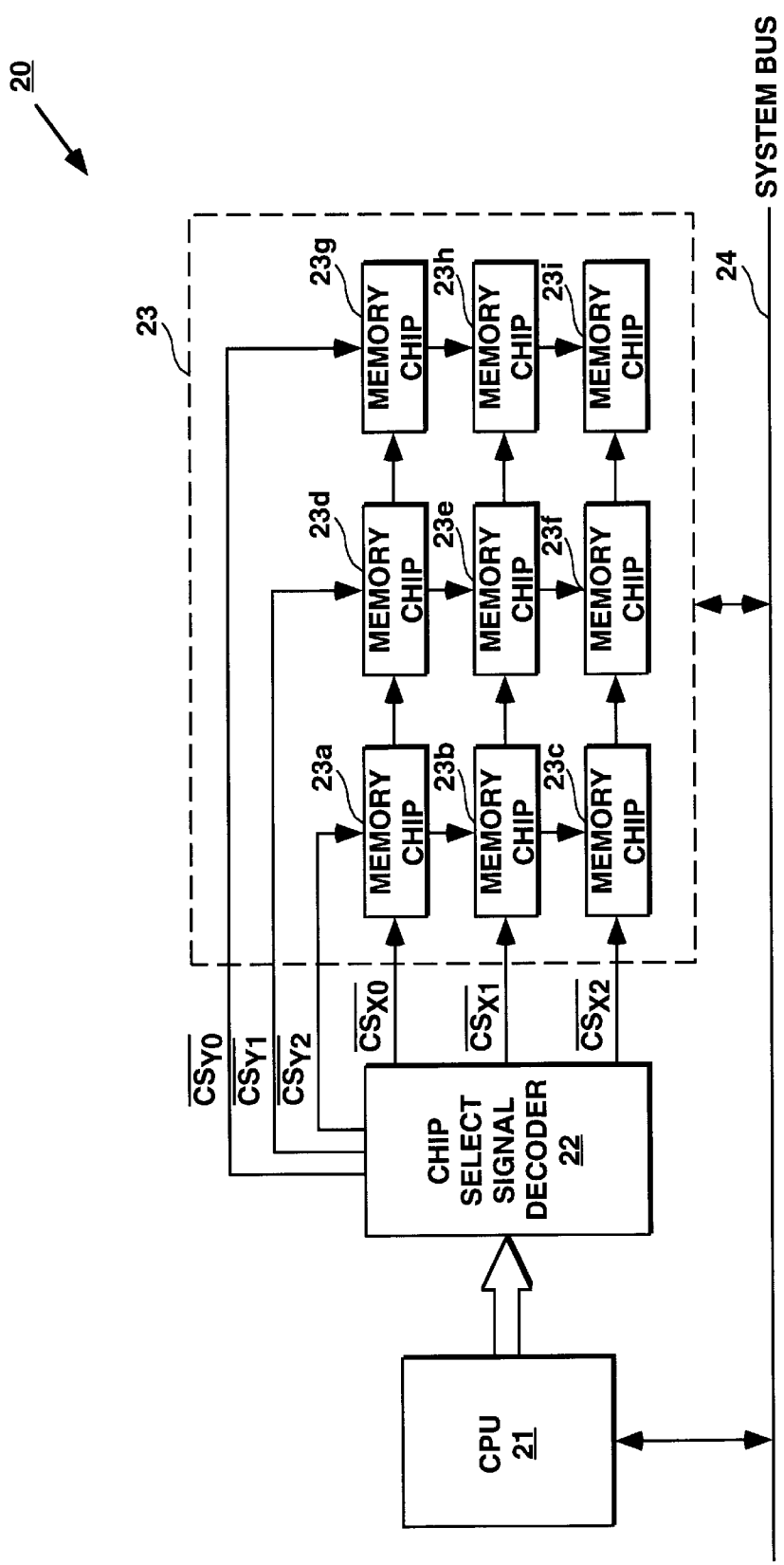
FIG. 2 shows another prior art scheme of selecting a memory device from an array of memory devices in a computer system.
Figure 3:
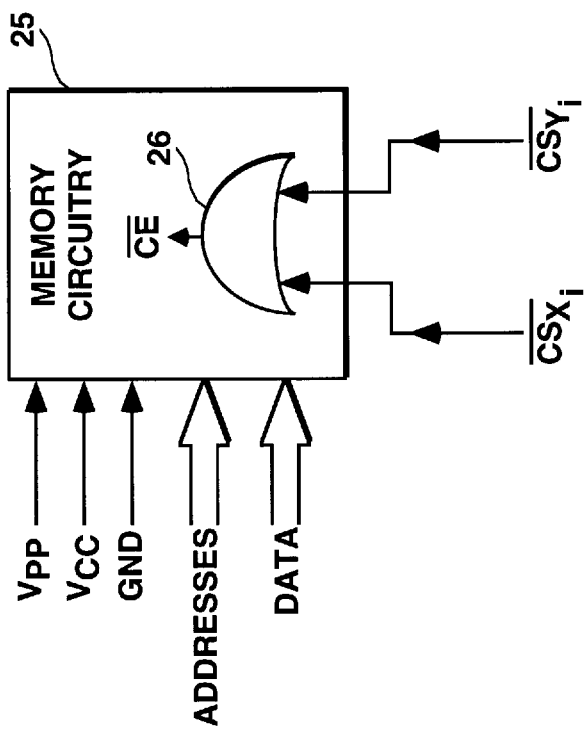
FIG. 3 shows the circuitry of one of the memory devices of FIG. 2.
Figure 4:
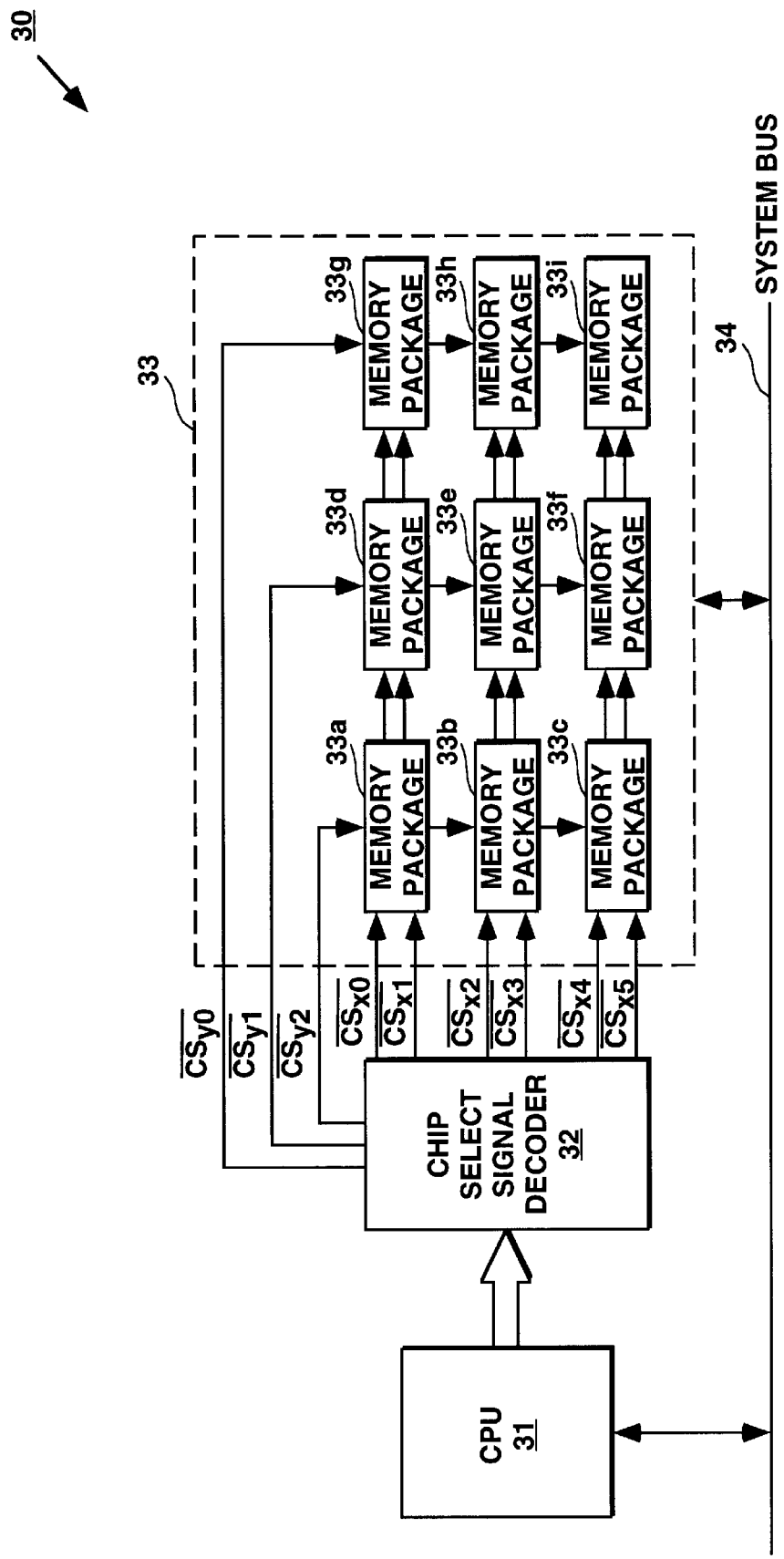
FIG. 4 shows yet another prior art scheme of selecting a memory device from an array of dual-device memory packages in a computer system.
Figure 5:
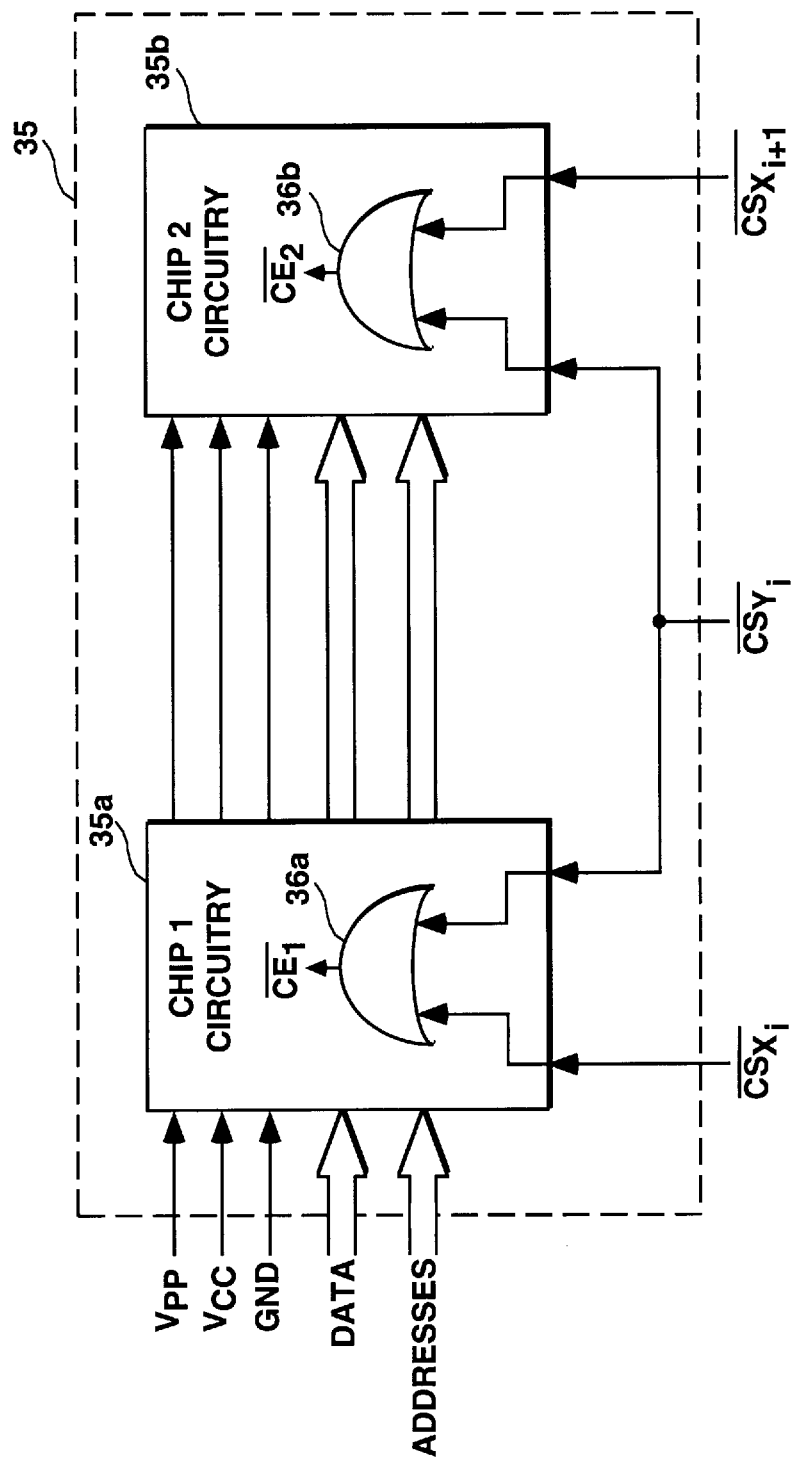
FIG. 5 is a block diagram of one of the dual-device memory packages of FIG. 4.

As can be seen from FIG. 7, each of memory packages 51a–54d is located at the intersection of a pair of row select lines and one column select line. For example, memory package 51a receives the X0 and X1 row select signals and the Y0 column select signal and memory package 54d is connected to receive the X6 and X7 row select signals and the Y3 column select signal. When each of memory packages 51a54d contains two chips, the structure of each of memory packages 51a–54d can be the same as that shown in FIG. 5. In this case, each of column select lines 56 is connected to both of the two chips within each of the memory packages along one column. In addition, each of row select lines 57 is connected to one of the two chips inside each of the memory packages along one row.

When each of memory packages 51a–54d contains only one chip, each of row select lines 57 that applies one of the row select signals X1, X3, X5, and X7 is not connected to anything within each of memory packages 51a–54dwhile each of row select lines 57 that applies one of the row select signals X0, X2, X4, and X6 signal is connected to the chip within each of the memory packages along one row. Therefore, the X0, X2, X4, and X6 row select signals are hereinafter referred to as the first row select signals for memory packages 51a–54d and the X1, X3, X5 and X7 row select signals are hereinafter referred to as the second row select signals for memory packages 51a–54d. In addition, when each of memory packages 51a–54d contains only one chip, each of column select lines 56 is only connected to one chip within each of the memory packages along one column.

As shown in FIG. 7, decoding and modifying logic 55 is used to decode a multi-bit chip select data to generate one of the columns select signals Y0–Y3 and one of the row select signals X0–X7. The asserted ones of the row and column select signals X0–X7 and Y0–Y3 then select one chip from one of memory packages 51a–54d. The chip select data is supplied from external circuitry (not shown). The external circuitry can be, for example, a CPU or other microcontroller or processor. Because each of memory packages 51a–54d may contain one or two chips, the chip select data may need to be modified in order for logic 55 to generate the appropriate select signals.

In accordance with one embodiment of the present invention, logic 55 modifies the chip select data before the data is being decoded when each of memory packages 51a–54d contains one chip. This is because when each of memory packages 51a–54d contains one chip, each of the row select lines that carries one of the second row select signals X1, X3, X5, and X7 is not connected to anything within each of memory packages 51a–54d, as described above. When this occurs, the second row select signals X1, X3, X5, and X7 should never be selected and should be skipped.

To skip these second row select signals X1, X3, X5, and X7, logic 55 multiplies the row select data portion of the chip select data with a constant equal to the number of row select lines connected to each of memory packages 51a–54d (i.e., two) before the chip select data is decoded in logic 55. In doing so, the external circuitry that generates the chip select data does not need to know whether each of memory packages 51a–54d contains one chip or two chips. In addition, the array configuration of array 50 does not need to be changed when each of memory packages 51a–54d in array 50 contains one chip.

Alternatively and as described above, array 50 can be configured such that each of memory packages 51a–54d can contain three chips. When this occurs, each of memory packages 51a–54d is connected to three of row select lines 57. In this case, if each of memory packages 51a–54d contains only one chip, two row select lines need to be skipped in order for the row select data to select each of the chips in the array. This can be done by multiplying the row select data with a constant of three.

In summary, when an array includes a number of memory or IC packages, each being connected to N number of select lines (e.g., row select lines), each of the number of packages can contain up to N number of chips. Here, N is a nonzero positive integer. In such an array configuration, when each of the packages contains only one chip, the select data that selects the appropriate select line needs to be multiplied by N such that the select lines that are not connected to any chip in the array does not get selected.

Referring again to FIG. 7, logic 55 also receives a control signal SELECT. The SELECT control signal indicates whether each of memory packages 51a–54d contains one chip or two chips. When each of memory packages 51a–54d contains only one chip, the SELECT signal is asserted to indicate the condition. The control signal SELECT, when asserted, causes logic 55 to modify the row select data portion of the chip select data by multiplying the row select data portion with the integer of two. When the SELECT signal is not asserted, logic 55 does not modify the chip select data.

The SELECT signal can be generated by a latch or register (not shown) that stores one bit of data. The data bit stored controls assertion of the SELECT signal. The latch or register can be accessed by other circuits (e.g., CPU). This allows the user to dynamically change the bit information whenever the number of chips contained in each of memory packages 51a–54d is changed. In addition, other circuits can also be used to generate the SELECT signal. For example, a memory cell may be used. Moreover, the SELECT signal can also be a software controlled signal.

Figure 8:
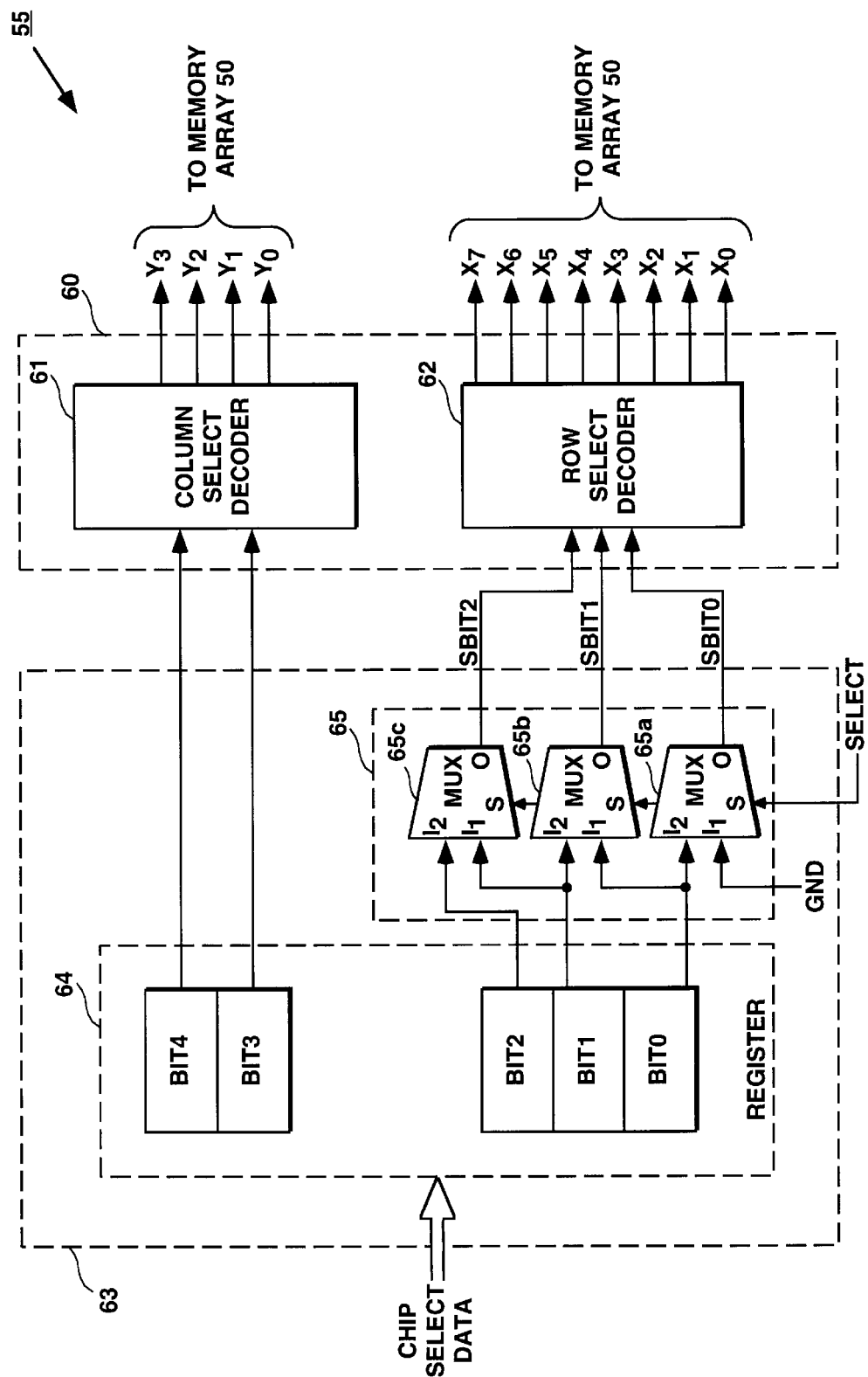
FIG. 8 shows the circuitry of a decoding logic of FIG. 7.

FIG. 8 illustrates the circuitry of logic 55 in accordance with one embodiment of the present invention. In addition, other circuits may also be used for logic 55 without depicting from the spirit of the present invention. The circuit shown in FIG. 8 will be described in more detail below.

Referring to FIG. 8, logic 55 includes a decoder logic 60 and a modifying logic 63. Decoder logic 60 includes a column select decoder 61 and row select decoder 62. The circuit of each of decoders 61 and 62 can be any known decoding circuit. Column select decoder 61 is coupled to column select lines 56 (FIG. 7) to apply the column select signals Y0 through Y3 to array 50. Row select decoder 62 is coupled to row select lines 57 (FIG. 7) to apply the row select signals X0 through X7 to array 50.

Modifying logic 63 includes a register 64 for receiving and storing the chip select data, and a multiplier logic 65. Register 64 can be any known register. For one embodiment as shown in FIG. 8, register 64 includes five bit registers BIT0 through BIT4. Each bit register stores one bit data of the chip select data. As can be seen from FIG. 8, bit registers BIT0 through BIT2 of register 64 store the row select data portion of the chip select data and bit registers BIT3 and BIT4 of register 64 stores the column select data portion of the chip select data. Because for array 50 of FIG. 7, only the row select data needs to be modified when each of memory packages 51a–54d contains one chip. The column select data is directly applied to column select decoder 61.

Because the row select data may need modification before being decoded, bit registers BIT0 through BIT2 of register 64 are connected to row select decoder 62 via multiplier logic 65.

Multiplier logic 65 multiplies the row select data stored in bit registers BIT0–BIT2 with the integer of two in accordance with the control signal SELECT. As can be seen from FIG. 8, logic 65 is essentially a shift register alternatively, logic 65 can be any other known multiplier circuits. Logic 65 includes multiplexers 65a through 65c, each having one input (i.e., $l_2$) coupled to one of bit registers BIT0–BIT2. The other input (i.e., $l_1$) of multiplexer 65c is coupled to bit register BIT1 and the $l_1$ input of multiplexer 65b is coupled to bit register BITb. The $l_1$ input of multiplexer 65a is coupled to ground GND. The select input of each of multiplexers 65a–65c is connected to the SELECT signal. When the SELECT signal is asserted, logic 65 shifts the row select data one bit position by connecting its $l_1$ input to its output in order to accomplish the multiplication function. The shifted data is then applied to row select decoder 62.

When the SELECT signal is not asserted, each of multiplexers 65a–65c connects its $l_2$ input to its output. This causes the row select data stored in bit registers BIT0–BIT2 to pass through logic 65 without modification.

FIG. 9 illustrates the truth table of the relationship between (1) the row select signals and the SELECT signal and (2) the row select data. As can be seen from FIG. 9, when the SELECT signal is not asserted, the row select data in bit registers BIT0–BIT2 is not modified and is directly passed through logic 64 to decoder 62. When, however, the SELECT signal is asserted, the row select data is multiplied by two such that the second row select signals X1, X3, X5, and X7 is never selected.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:

an array of integrated circuit packages, each integrated circuit package comprising N die, wherein N is greater than 0;

a plurality of chip select lines, wherein M rows of chip select lines are coupled to each integrated circuit package, wherein $M \geq N$, wherein each die is coupled to a corresponding one of the M row chip select lines;

a decoder for selecting a selected die in response to chip select data; and logic circuitry for providing the chip select data to the decoder, wherein the logic circuitry modifies a row portion of the chip select data when M>N to ensure that the decoder only selects chip select lines coupled to corresponding dies.

2. The apparatus of claim 1 wherein the logic circuitry further comprises a multiplier.

3. The apparatus of claim 1, wherein the logic circuitry multiplies the row portion of the chip select data by M, if N=1.

4. The apparatus of claim 1 wherein $N \geq 2$.

5. The apparatus of claim 1, wherein each die is a memory device.

6. The apparatus of claim 1, wherein the logic circuitry further comprises:

a register for storing the chip select data; and a multiplier circuit for multiplying at least a portion of the chip select data by an integer value.

7. An apparatus comprising:

an array of integrated circuit packages, each integrated circuit package comprising N die, wherein N is greater than 0;

a plurality of chip column select lines, each chip column select line corresponding to a column of the array, each chip column select line coupled to every die within every integrated circuit package in a same column of the array;

a plurality of chip row select lines, wherein each integrated circuit package within a same row of the array is coupled to a same M chip row select lines, wherein each die within the same row of the array is coupled to a corresponding one of the M chip row select lines, wherein $M \geq N$;

a decoder for decoding chip select data to select a die at a selected chip row select line and selected chip column select line; and logic circuitry for providing the chip select data, wherein the logic circuitry modifies a row portion of the chip select data when M>N to ensure that the decoder only selects chip row select lines coupled to die.

8. The apparatus of claim 7 wherein the logic circuitry further comprises a multiplier.

9. The apparatus of claim 7, wherein the logic circuitry multiplies the row portion of the chip select data by M, if N=1.

10. The apparatus of claim 7 wherein $N \geq 2$.

11. (New) The apparatus of claim 7, wherein each die is a memory device.

12. The apparatus of claim 7, wherein the logic circuitry further comprises:

a register for storing the chip select data; and a multiplier circuit for multiplying at least a portion of the chip select data by an integer value.

13. A method of selecting a selected die from an array of integrated circuit packages, comprising the steps of:

a) decoding column select data to select a selected chip column select line, wherein each integrated circuit package within a same column of the array is coupled to a same chip column select line, wherein each integrated circuit package comprises N die;

b) decoding row select data to select a selected chip row select line, wherein each integrated circuit within a same row of the array is coupled to a same M chip row select lines, wherein each die within the same row of the array is coupled to a corresponding one of the M chip row select lines, wherein $M \geq N$; and c) modifying the row select data before step b) if M>N to ensure that only chip row lines coupled to a corresponding die are selected.

14. The method of claim 13, wherein step c) further comprises the step of:

i) multiplying the row select data by an integer value if M>N.

15. The apparatus of claim 13, wherein the logic circuitry multiplies the row portion of the chip select data by M, if N=1.

16. The method of claim 13 wherein $N \geq 2$.

17. The method of claim 13, wherein each die is a memory device.

18. The method of claim 13 wherein step c) further comprises the step of shifting the row select data.

* * * * *

UNITED STATES PATENT AND TRADEMARK OFFICE
CERTIFICATE OF CORRECTION

PATENT NO. : 5,867,721 Page 1 of 1
DATED : February 2, 1999
INVENTOR(S) : Leinwander et al.

It is certified that error appears in the above-identified patent and that said Letters Patent is hereby corrected as shown below:

Column 4,
Line 50, delete "51a51d" and insert -- 51a-51d --.

Column 6,
Line 52, delete "BITb" and insert -- BIT0 --.

Column 8,
Line 18, delete "(New)".

Signed and Sealed this

Second Day of December, 2003

JAMES E. ROGAN
*Director of the United States Patent and Trademark Office*